United States Patent [19]
Chen

[11] Patent Number: 5,926,962
[45] Date of Patent: Jul. 27, 1999

[54] HANDLE OF A SAW

[76] Inventor: Wen-Ger Chen, Room 707, No. 262, Section 2, Ho-Nan Road, Taichung, Taiwan

[21] Appl. No.: 09/157,112

[22] Filed: Sep. 18, 1998

[51] Int. Cl.⁶ .................................................. B23D 51/01
[52] U.S. Cl. ................................... 30/519; 30/517; D7/97
[58] Field of Search .......................... 30/517–520, 514, 30/340, 160, 161, 125; D7/97

[56] References Cited

U.S. PATENT DOCUMENTS

| | | | |
|---|---|---|---|
| 1,638,749 | 8/1927 | Santoyo | 30/161 |
| 2,767,751 | 10/1956 | Sjoblom | 30/517 X |
| 5,711,077 | 1/1998 | Schulz et al. | 30/160 |
| 5,794,345 | 8/1998 | Ryon et al. | 30/517 X |

*Primary Examiner*—Douglas D. Watts
*Attorney, Agent, or Firm*—Rosenberg, Klein & Bilker

[57] ABSTRACT

A saw includes a saw blade pivotally connected to the handle which is an enclosed handle having a curved top portion to which the user's hand holds and a bottom portion consists of two frames between which a slit is defined so that the saw blade is received between the two frames via the slit. Each of the frames has a slot defined there through which communicates with the slit so that the toothed side of the saw blade is accessed via the slots.

3 Claims, 4 Drawing Sheets

HANDLE OF A SAW

FIELD OF THE INVENTION

The present invention relates to a handle structure, and more particularly, to a handle of a saw, wherein the handle having an enclosed shape with a slit defined in an underside thereof so as to receive the saw blade therein.

BACKGROUND OF THE INVENTION

A conventional saw is shown in FIG. 1 and includes a handle 10 and a saw blade 11 which is connected to the handle 10. When using the saw, the user's handle holds the handle 10 and exerts a downward force to the saw blade 11 toward the object such as a wooden board 12. When the wooden board is cut by the saw, the inertial force of the downward force to the saw could make the hand holding the handle 10 suddenly hit the board 12 to hurt the fingers of the user's hand. Furthermore, the hand holding the handle 10 is exposed so that when operating the saw, the hand could be hit by other machines located beside the board to be cut.

The present invention provides the saw having an O-shaped handle so that fingers is protected by the handle and will not be hit. Besides, the handle further has a slit defined in an underside thereof so as to receive the saw blade and two side slots communicate with the slit so as to easily proceed maintenance for the saw blade via the two side slots.

SUMMARY OF THE INVENTION

In accordance with one aspect of the present invention, there is provided a saw comprising a saw blade and a handle which has a curved top portion and a bottom portion connected between two ends of the curved top portion. The curved top portion has the first end thereof connected to the saw blade and the bottom portion includes two frames with a slit defined between the two frames. Each of the two frames has a slot defined therethrough which communicates with the slit through which the saw blade is received between the two frames.

An object of the present invention is to provide a saw which protects the user's hand.

Another object of the present invention is to provide a saw wherein the saw blade is able to be received in the handle and conveniently accessed via slots of the bottom portion of the handle.

Further objects, advantages, and features of the present invention will become apparent from the following detailed description with appropriate reference to the accompanying drawings.

DETAILED DESCRIPTION OF THE PREFERRED EMBODIMENT

Figure 1:
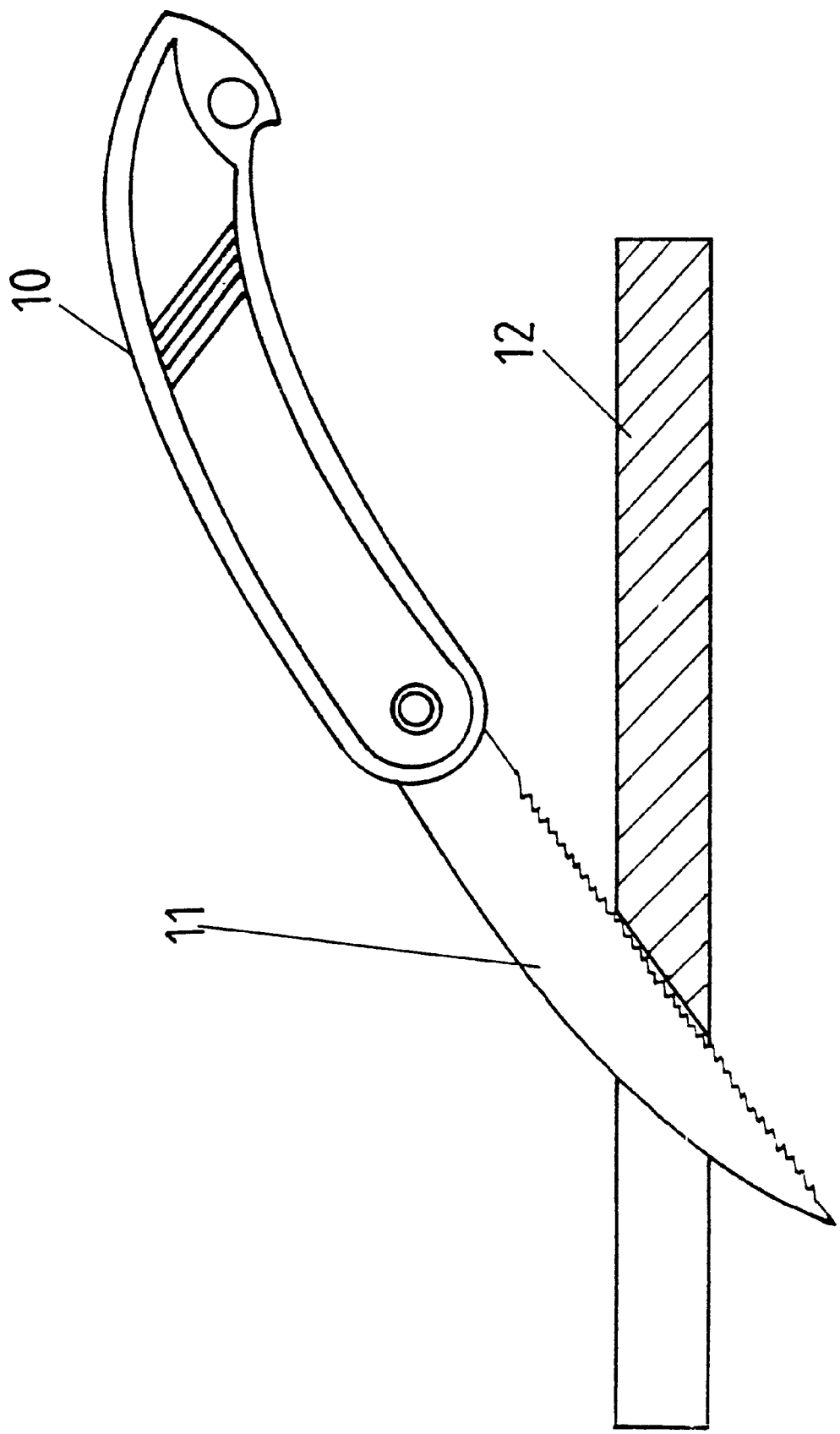
FIG. 1 is an illustrative view to illustrate the conventional saw to cut an object.
Figure 2:
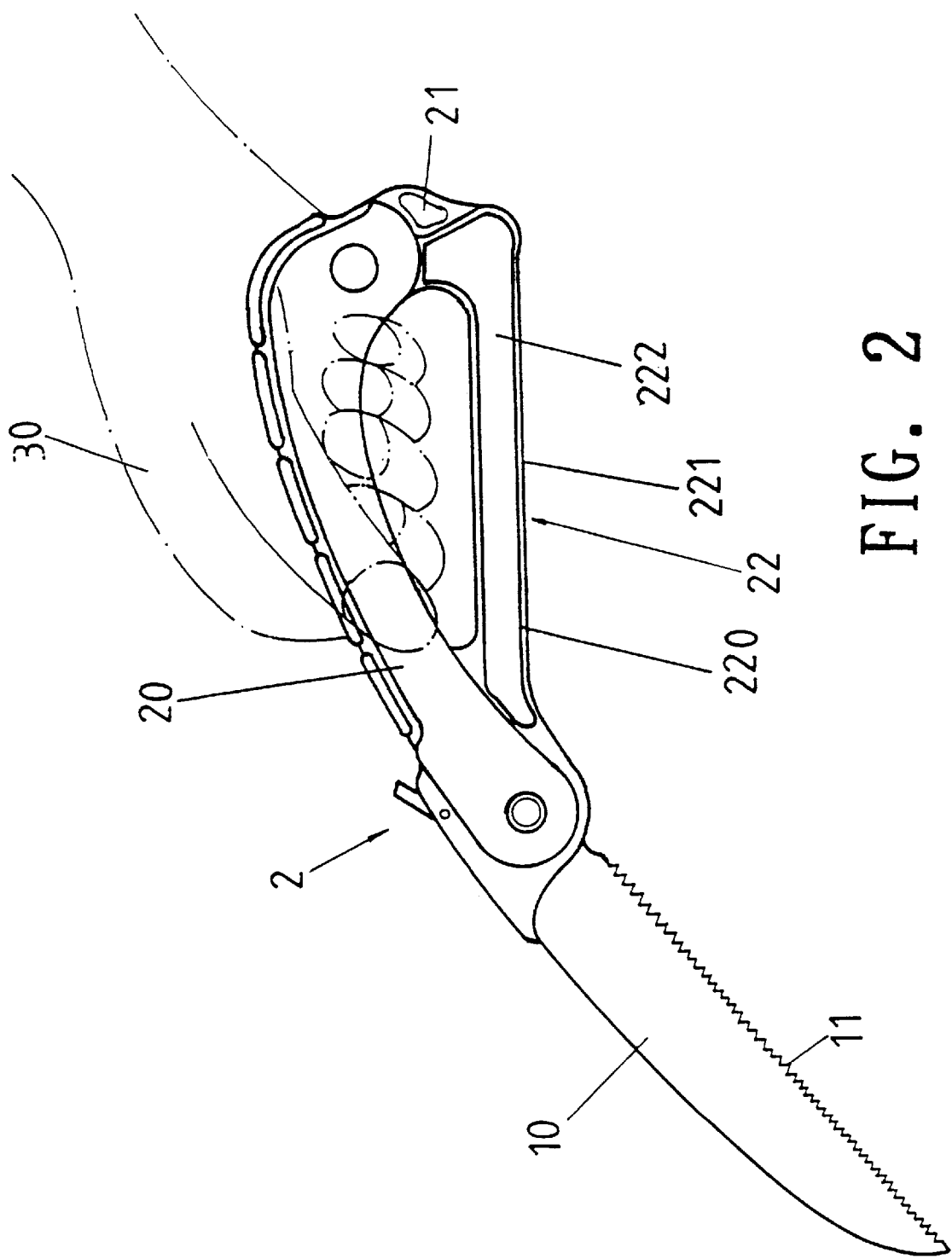
FIG. 2 is an illustrative view to illustrate the saw in accordance with the present invention.
Figure 3:
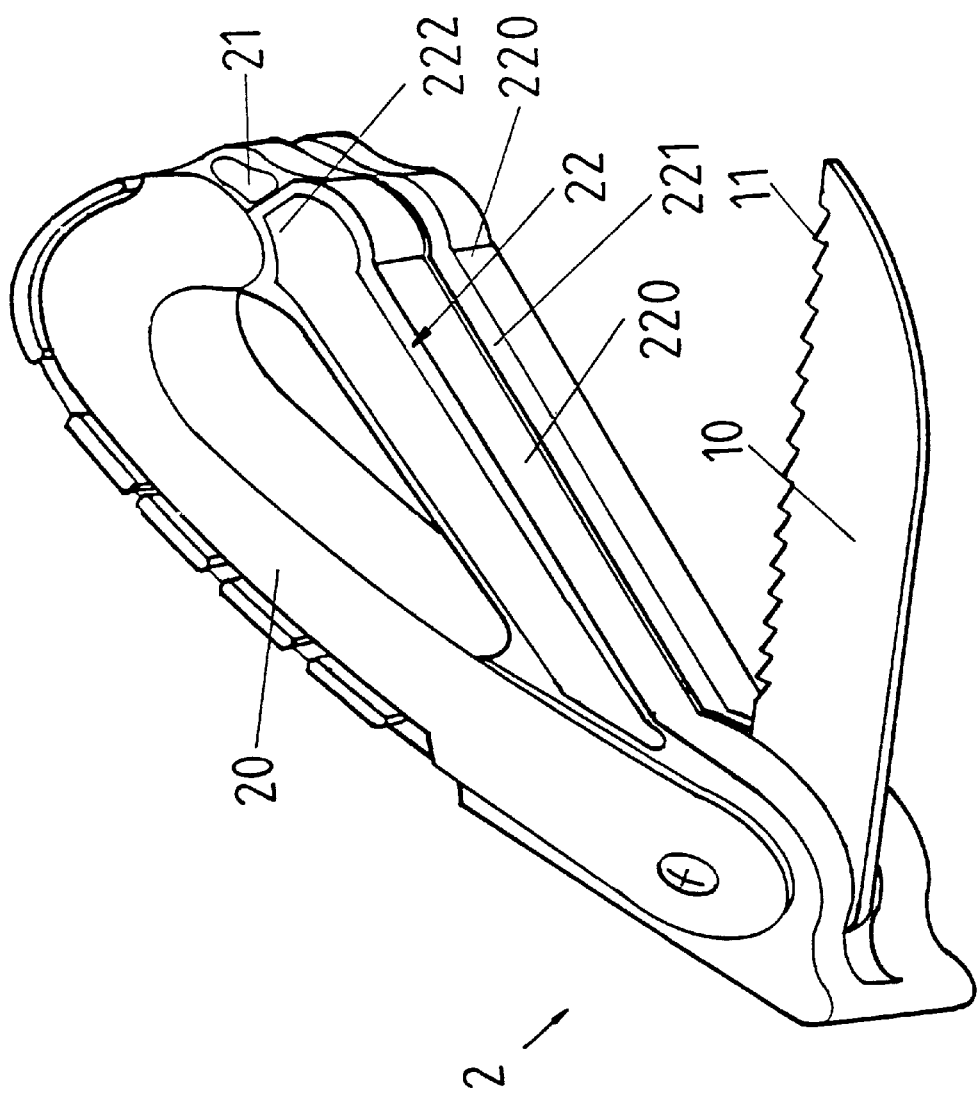
FIG. 3 is a perspective view of the saw in accordance with the present invention.
Figure 4:
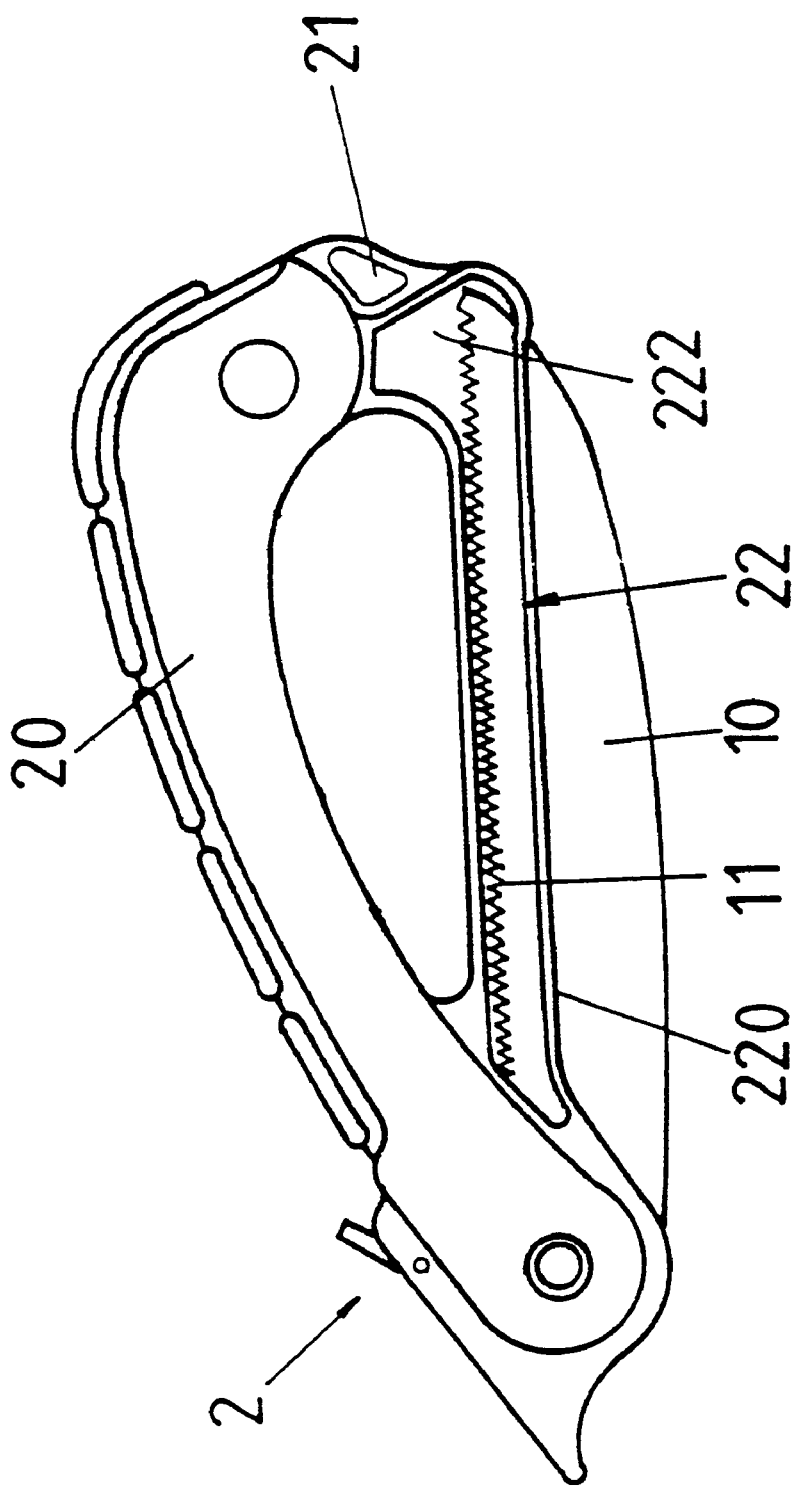
FIG. 4 is a side elevational view to show the saw in accordance with the present invention wherein the saw blade is received in the handle.

Referring to FIGS. 2 to 4, the saw in accordance with the present invention comprises a saw blade 10 having a toothed side 11 and a handle 2. The handle 2 has a curved top portion 20 and a bottom portion 22 which is connected between two ends of the curved top portion 20 so that the handle 2 is an enclosed handle and the user's hand 30 may hold the cured top portion 20 and the fingers are protected by the bottom portion 22. The curved top portion 20 has the first end thereof connected to the saw blade 10 and the second end thereof having an aperture 21 defined therethrough. The bottom portion 22 includes two frames 220 and a slit 221 defined between the two frames 220 so that the saw blade 10 is received between the two frames 220 via the slit 221. Each of the two frames 220 has a slot 222 defined therethrough which communicates with the slit 221 as shown in FIG. 4.

It is to be noted that the toothed side 11 of the saw blade 10 is conveniently accessed via the two slots 222 when the saw blade 10 is received between the two frames 220. Therefore, the toothed side 11 of the saw blade 10 is easily lubricated or proceeded maintenance via the slots 222. When using the saw, the fingers of the user is protected by the bottom portion 22 so that when an object is cut into two sections, the inertial force of the saw will let the bottom portion 22 hit other things, not the user's fingers.

The invention is not limited to the above embodiment but various modification thereof may be made. It will be understood by those skilled in the art that various changes in form and detail may made without departing from the scope and spirit of the present invention.

What is claimed is:

1. A saw comprising:

a saw blade, and a handle having a curved top portion and a bottom portion which is connected between two ends of the curved top portion, said curved top portion having the first end thereof connected to said saw blade, said bottom portion including two frames and a slit defined between said two frames, each of said two frames having a slot defined therethrough which communicates with said slit through which said saw blade is received between said two frames.

2. The saw as claimed in claim 1 further comprising an aperture defined in the second end of said curved top portion.

3. The saw as claimed in claim 1, wherein said saw blade has a toothed side which is accessed via said two slots when the saw blade is received between said two frames.

* * * * *